G. W. CRAIG.
Weighing-Scale.
No. 204,888. Patented June 18, 1878.
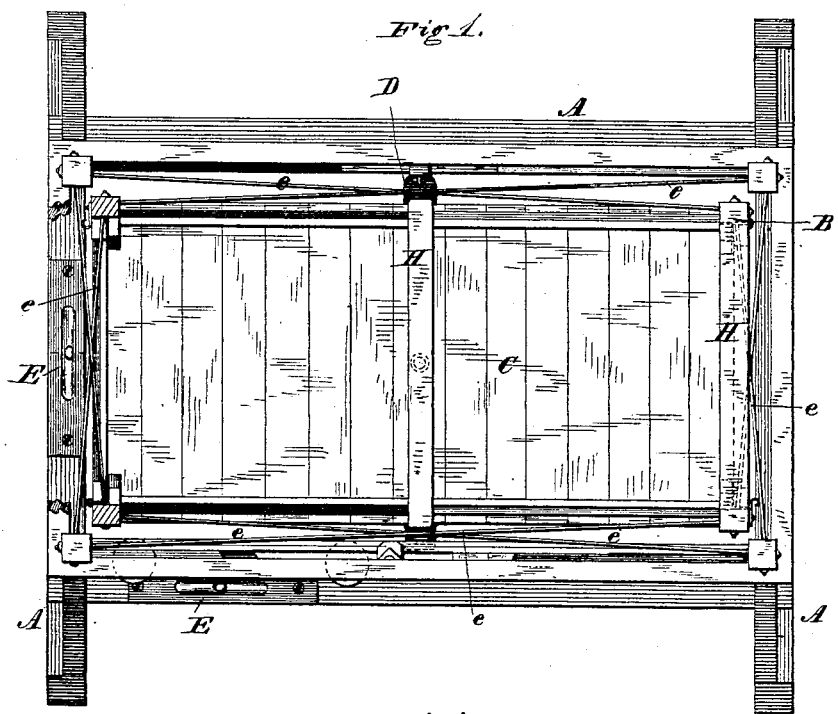
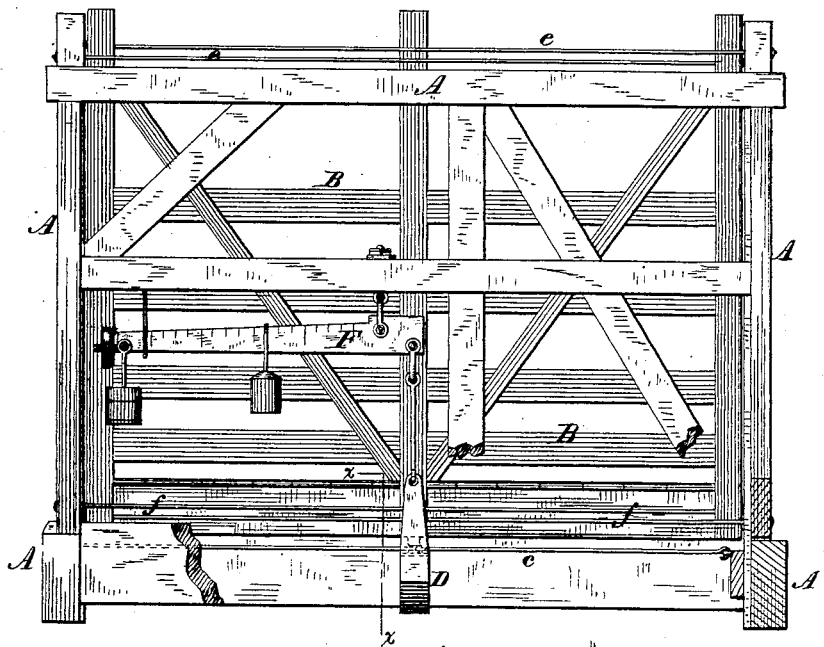
Witnesses
Harry King
N. M. Stansbury
Inventor
G. W. Craig
By Stansbury & Munn
his Attys

UNITED STATES PATENT OFFICE.

GEORGE W. CRAIG, OF ARBUCKLE, WEST VIRGINIA.

IMPROVEMENT IN WEIGHING-SCALES.

Specification forming part of Letters Patent No. 204,888, dated June 18, 1878; application filed May 9, 1878.

*To all whom it may concern:*

Be it known that I, GEORGE W. CRAIG, of Arbuckle, in the county of Mason and State of West Virginia, have invented certain new and useful Improvements in Scales for Weighing Stock, Grain, Hay, &c.; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

Figure 1 is a top-plan view with one cross-piece of the pen removed. Fig. 2 is a side elevation with a portion broken away; and Fig. 3 is a cross-section on the line $x\ x$ of Fig. 2, looking toward the lower scale-beam.

My invention consists of a stout frame with a stock-pen arranged within it to rest upon a pivot on the upper side of a lever-beam, and also arranged to be held in an upright position, away from the frame, by horizontal check-rods, as hereinafter explained, the object being to produce a simple, cheap, and portable scale for weighing stock, grain, hay, &c.

In the drawings, A represents a strong open rectangular frame, made of any size desired, consisting of upright posts, cross-pieces, and braces, as shown in both figures; D, a lever-beam, arranged midway between the longitudinal base-beams of the frame by having one end connected by a hook, link, or other suitable device to one of the beams, and the other to an ordinary weighing-scale, F, attached to the sides of the frame, as clearly shown in Figs. 2 and 3. The lever-beam D has secured to the center of its upper side a pivot, $d$, and also has attached to it a horizontal check-rod, $c$, connecting it with the sides of the frame for preventing any horizontal motion, as shown in the same figures.

Within the frame A, and upon the pivot-point $d$, a strong stock-pen, B, suitable for holding stock, is mounted, the pen having a pivot-socket, $a$, attached to the under side of its middle floor-beam $g$ for that purpose, as clearly shown in Fig. 3.

The pen is made with a strong floor, C, and the middle beam of the floor is held rigidly in position by braces $h$, extending to the side beams, as shown in the same figure, and is held in a horizontal position, and away from the sides of the frame A, by a series of horizontal check-rods, $e$, extending from its corner-posts to the corner-posts of the frame, crosswise along the sides and ends of the same, as clearly shown in Fig. 1. There may be two sets of these check-rods, one connecting the posts at their upper and the other at their lower ends, as shown in Fig. 2, and more, if desired. By this arrangement of the check-rods it will be seen that while the pen cannot have any horizontal motion, its vertical motion within the limits required for weighing stock is not interfered with.

As my stock-scale is intended to be portable, I place in the base-beams two spirit-levels, E, as shown in Fig. 1, so that it may at any time be placed level; and as it is to be used outdoors mainly, I place beams H across the upper ends of the posts of the pen, as shown in Fig. 1, for receiving and holding a roof, whenever desired.

In this way I produce a simple, cheap, portable scale for weighing stock, grain, hay, &c., which may be set up where desired, and in which the pen is always held in an upright horizontal position, away from contact with its surroundings, and yet free to move vertically.

Having thus described my invention, what I claim is—

1. In combination with an ordinary weighing-scale, the frame A, stock-pen B, and horizontal check-fastenings $e$, constructed and arranged substantially as described.

2. The horizontal fastenings $e$, in combination with the stock-pen B, pivoted upon the lever-beam D, as described, and for the purpose explained.

3. In combination with the lever-beam D, having the stock-pen B pivoted thereon, the check-rod C, as and for the purpose set forth.

In testimony that I claim the foregoing as my own I affix my signature in presence of two witnesses.

GEORGE W. CRAIG.

Witnesses:
 HARRY D. SHREWSBURY,
 W. SYDNEY LAIDLEY.